(12) United States Patent
Weltman (10) Patent No.: US 7,882,851 B2
(45) Date of Patent: *Feb. 8, 2011

(54) PRESSURE ACTIVATED TRAP PRIMER AND WATER HAMMER COMBINATION

(76) Inventor: Brian Weltman, 3930 SE. Caruthers St., Portland, OR (US) 97214

( * ) Notice: Subject to any disclaimer, the term of this patent is extended or adjusted under 35 U.S.C. 154(b) by 646 days.

This patent is subject to a terminal disclaimer.

(21) Appl. No.: 11/784,424

(22) Filed: Apr. 6, 2007

(65) Prior Publication Data

US 2007/0209707 A1 Sep. 13, 2007

Related U.S. Application Data

(63) Continuation-in-part of application No. 11/131,731, filed on May 17, 2005, now Pat. No. 7,520,292.

(51) Int. Cl.
*E03C 1/296* (2006.01)
(52) U.S. Cl. .............. 137/118.05; 137/247.25; 138/30
(58) Field of Classification Search ........... 137/118.05, 137/216, 247.25; 138/30
See application file for complete search history.

(56) References Cited

U.S. PATENT DOCUMENTS

| 2,096,287 | A |  | 10/1937 | McDougall |  |
|---|---|---|---|---|---|
| 3,333,597 | A |  | 8/1967 | Sullivan |  |
| 3,422,835 | A | * | 1/1969 | Watts | 137/115.06 |
| 4,204,556 | A |  | 5/1980 | Sullivan |  |
| 4,497,337 | A |  | 2/1985 | Mosbrucker |  |
| 5,263,508 | A |  | 11/1993 | Perrott |  |
| 5,287,877 | A |  | 2/1994 | Ackroyd |  |
| 5,678,588 | A |  | 10/1997 | Perrott et al. |  |
| 5,797,419 | A | * | 8/1998 | Perrott et al. | 137/216 |
| 6,152,164 | A |  | 11/2000 | Whiteside |  |
| 6,325,091 | B1 | * | 12/2001 | Perrott et al. | 137/247.25 |
| 7,520,292 | B2 | * | 4/2009 | Weltman | 137/118.05 |

* cited by examiner

*Primary Examiner*—John Rivell
(74) *Attorney, Agent, or Firm*—Rylander & Associates P.C.; Mark E. Beatty; Kurt M. Rylander (57) ABSTRACT

A water hammer arrestor and drain trap primer valve includes a hollow pipe having a closed end, a discharging end, an inlet, an outlet port connected to said discharging end and attachable to plumbing tubing, an inlet port connected to said inlet and attachable to plumbing tubing, an insert plug within said pipe positioned at said discharging end and at said inlet, said insert plug substantially tubular with opposing flats, and having a longitudinal cylindrical bore and a latitudinal threaded through bore, a port bolt within a portion of said insert plug and a portion of said inlet port, said port bolt substantially tubular and having a longitudinal cylindrical bore and a latitudinal through bore distributor aligned with the insert plug longitudinal cylindrical bore, and a check piston within said pipe and slidingly engageable with said insert plug and said outlet port wherein said check piston engages slidably responsive to water pressure changes at said inlet port and an integral air gap outlet.

20 Claims, 7 Drawing Sheets

PRESSURE ACTIVATED TRAP PRIMER AND WATER HAMMER COMBINATION

CROSS-REFERENCE

This application is a Continuation-in-Part of, and claims priority to, U.S. patent application Ser. No. 11/131,731 filed May 17, 2005 now U.S. Pat. No. 7,520,292.

FIELD OF THE INVENTION

The present invention relates to water hammer arrestors and drain trap primer valves.

BACKGROUND

Water hammer is a common problem in domestic water plumbing systems. The negative effects of water hammer include damage to pipes and pipe fittings due to vibration, shock, and physical displacement, as well as annoyance due to the loud noises generated. Existing solutions have relied on pressure regulators to control pressure surges or surge tanks. Both have disadvantages. Pressure regulators require adjustment at installation and periodically after installation. Small clearances within pressure regulators can get plugged by particles or mineral buildup common in domestic water systems rendering them inoperable, or requiring strainers or screens. Pressure regulators designed for domestic water systems also don't operate fast enough to stop a water hammer event. Surge tanks combined with check valves can aid in reducing water hammer, but surge tanks impose significant space requirements and generally cannot be located near enough to each of the sources of water hammer events to prevent the pressure waves from traveling throughout the piping system.

Thus, there is a need for a water hammer prevention device that is compact, simple, inexpensive, virtually maintenance free, and self-flushing, which can be installed in domestic piping systems close to the source of water hammer events.

Automatic drain trap primers are known in the art. Automatic drain trap primers port small amounts of water to drain in order to maintain water seals in drain traps that prevent sewer gases from leaking back through drain pipes. Automatic drain trap primers generally work based on pressure fluctuations in domestic water supply systems. When water pressure in the domestic water supply line drops due to a valve opening, such as a faucet or a toilet flushing, the drain trap primer valve cycles and ports water to drain. Drain trap primers, however, provide no protection from water hammer. Automatic drain trap primers, moreover, tend to be vulnerable to leakage because they must be adjusted to the anticipated system pressure—if the nominal system pressure persists below the pre-set pressure, then the pre-set automatic drain trap primers may continuously port water to drain. Some drain trap primers have attempted to solve this problem of leak by, but they still lack the ability to protect against water hammer events.

Thus, there is also a need for an automatic drain trap primer that automatically adjusts to varying domestic water supply line pressures, that is compact, simple, inexpensive, virtually maintenance free, and which provides protection from water hammer.

Presently known art attempts to address this problem, but has not completely solved the problem. The following represents a list of known related art:

| Reference: | Issued to: | Date of Issue: |
|---|---|---|
| U.S. Pat. No. 6,152,164 | Whiteside | Nov. 28, 2000 |
| U.S. Pat. No. 5,678,588 | Perrott, et al | Oct. 21, 1997 |
| U.S. Pat. No. 5,287,877 | Ackroyd | Feb. 22, 1994 |
| U.S. Pat. No. 5,263,508 | Perrott | Nov. 23, 1993 |
| U.S. Pat. No. 4,497,337 | Mosbrucker, et al | Feb. 5, 1985 |
| U.S. Pat. No. 4,204,556 | Sullivan | May 27, 1980 |
| U.S. Pat. No. 3,422,835 | Watts | Dec. 20, 1965 |
| U.S. Pat. No. 3,333,597 | Sullivan | Nov. 5, 1964 |
| U.S. Pat. No. 2,096,287 | McDougall | Apr. 17, 1937 |

The teachings of each of the above-listed citations (which does not itself incorporate essential material by reference) are herein incorporated by reference. None of the above inventions and patents, taken either singularly or in combination, is seen to describe the instant invention as claimed.

SUMMARY AND ADVANTAGES

A water hammer arrestor and drain trap primer valve includes a hollow pipe having a closed end, a discharging end, an inlet, an outlet port connected to said discharging end and attachable to plumbing tubing, an inlet port connected to said inlet and attachable to plumbing tubing, an insert plug within said pipe positioned at said discharging end and at said inlet, said insert plug substantially tubular with opposing flats, and having a longitudinal cylindrical bore and a latitudinal threaded through bore, a port bolt within a portion of said insert plug and a portion of said inlet port, said port bolt substantially tubular and having a longitudinal cylindrical bore and a latitudinal through bore distributor aligned with the insert plug longitudinal cylindrical bore, and a check piston within said pipe and slidingly engageable with said insert plug and said outlet port wherein said check piston engages slidably responsive to water pressure changes at said inlet port.

An air piston can be added separating the air chamber from incoming water to dampen response due to smaller pressure fluctuations not amounting to water hammer. Addition of an internal bypass check valve improves performance for severe water hammer problems. The capacity of the water hammer reducer may be increased by simply lengthening the air chamber to provide greater expansion volume.

A water hammer arrestor and drain trap primer valve can include an integral air gap. Air gap apparatus are used in plumbing systems to provide a positive separation between supply system piping and drain system piping to prevent any possibility of siphoning drain effluents back into the supply system. Air gaps are required by building and plumbing codes in many regions, but traditionally have been installed as separate fixtures, with added expense and potential difficulty with installing a separate fixture and fittings into an already tight space typical of situations where drain traps or water hammer arrestors are installed close to appliances. Integrating a building code compliant air gap into a water hammer arrestor and drain trap primer provides significant space savings and reduces installation cost.

A water hammer arrestor and drain trap primer valve with integral air gap includes numerous advantages including: a single apparatus both reduces water hammer and primes drain traps; by discharging the displaced water to drain, rather than returning it to the system piping, little to no return pressure wave is generated and the water hammer effect ceases rapidly; able to act as a drain trap primer to prevent backflow of sewer gases up through system drains; self flushing; few moving parts; inlet screens are not necessary; and maintenance is substantially reduced; and, the danger of backflow is eliminated.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

Figure 1:
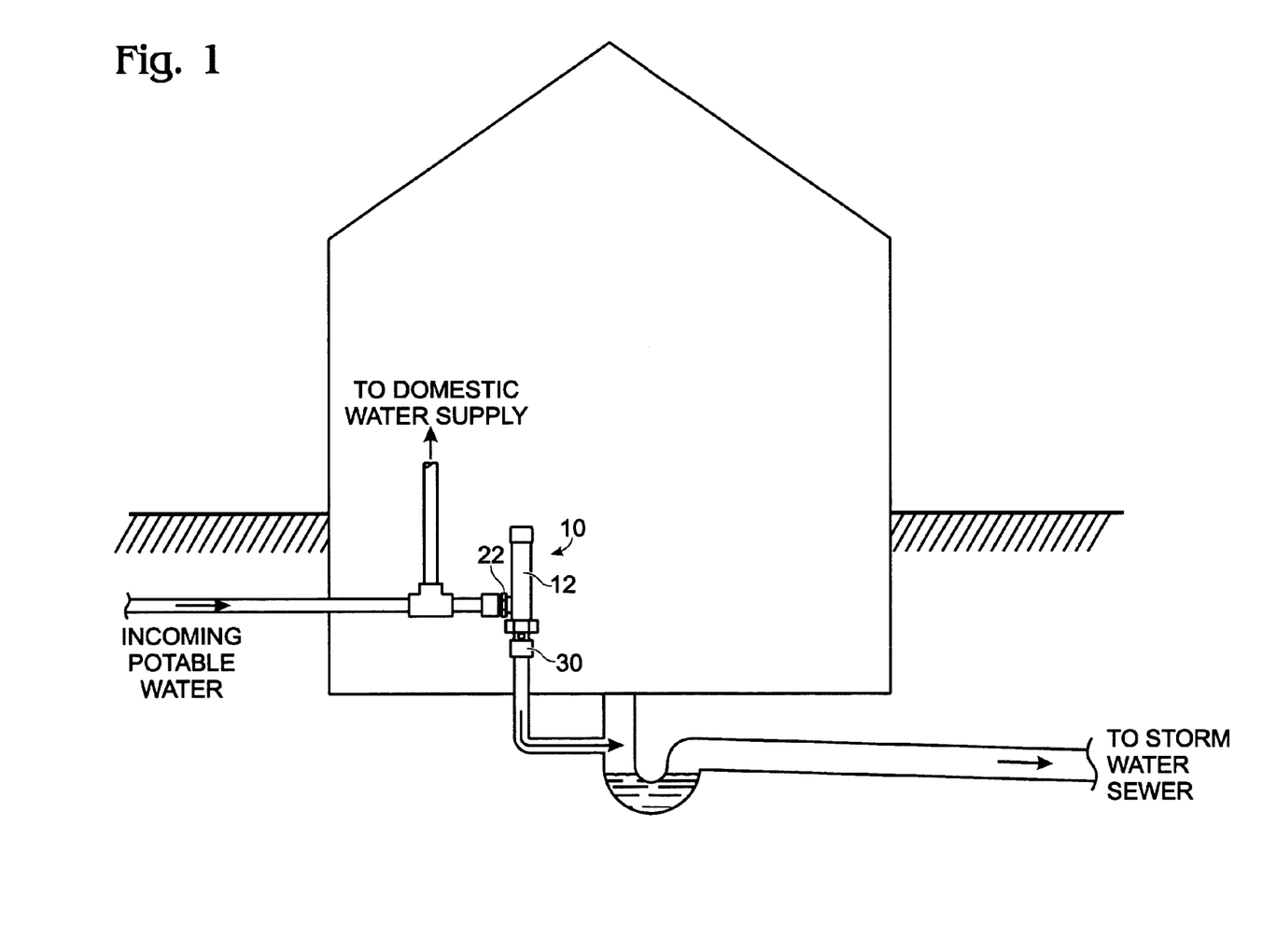
FIG. 1 shows an over-view schematic figure of an embodiment of the present invention installed in a typical domestic water system.
Figures 2, 3:
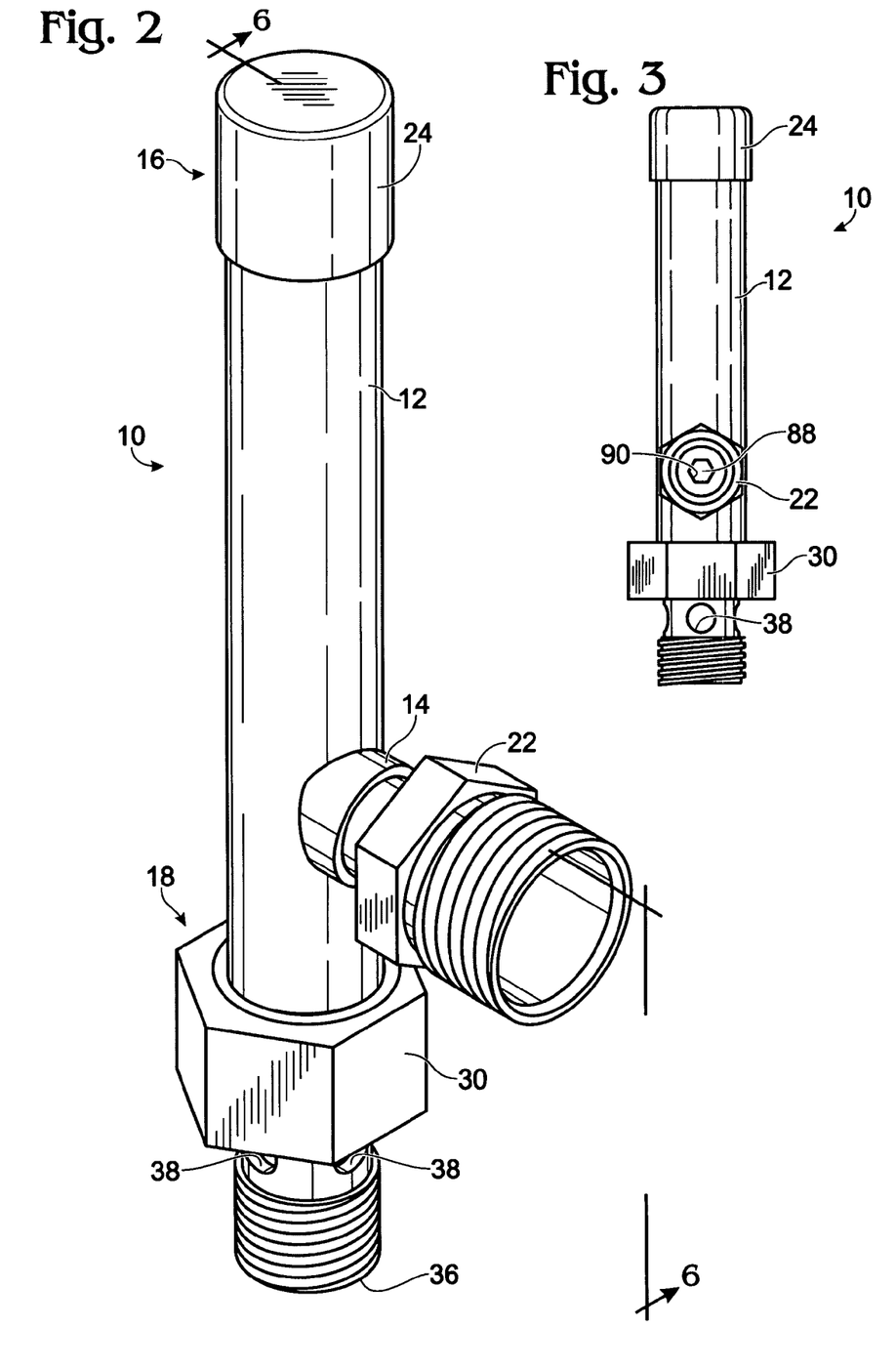
FIG. 2 shows an isometric view of an embodiment of the present invention.
FIG. 3 shows a side elevation of an embodiment of the present invention.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure. A water hammer arrestor and trap seal primer valve communicating with a variable pressure supply water line for automatically discharging water to be conveyed to sewer line drain traps. An internal chamber containing air or other compressible gas forms the integral water hammer arrestor providing protection from water hammer effects and allowing automatic water discharge whenever the device is subjected to pressure spikes or drops in pressure. Internal check mechanisms open to allow the water to enter into the valve compressing the internal gas chamber. Once the gas chamber is compressed, a drop in relative pressure on the supply side will close the check mechanisms and direct the water out the discharge port A water hammer arrestor and drain trap primer valve 10 is provided and, as shown in FIGS. 1-11, includes a hollow pipe tee tube 12 having a closed end 16, a discharging end 18, and inlet 14, an outlet port 30 connected to said discharging end 18 and attachable to plumbing tubing, an inlet port 22 connected to said inlet 14 and attachable to plumbing tubing, an insert plug 60 (or 200) within said pipe 12 positioned at said discharging end 18 and at said inlet 14, said insert plug 60 (or 200) substantially tubular with opposing flats 68, and having a longitudinal cylindrical bore 72 and a latitudinal threaded through bore 64, a port bolt 80 within a portion of said insert plug 60 (or 200) and a portion of said inlet port 22, said port bolt 80 substantially tubular and having a longitudinal cylindrical bore 88 and a latitudinal through bore distributor 92 aligned with the insert plug longitudinal cylindrical bore 72, and a check piston 54 within said pipe 12 and slidingly engageable with said insert plug 60 (or 200) and said outlet port 30 wherein said check piston 54 engages slidably responsive to water pressure changes at said inlet port 22. FIG. 1 shows a typical installation of an embodiment of a water hammer arrestor and drain trap primer valve 10 in a domestic water system.

Figure 5:
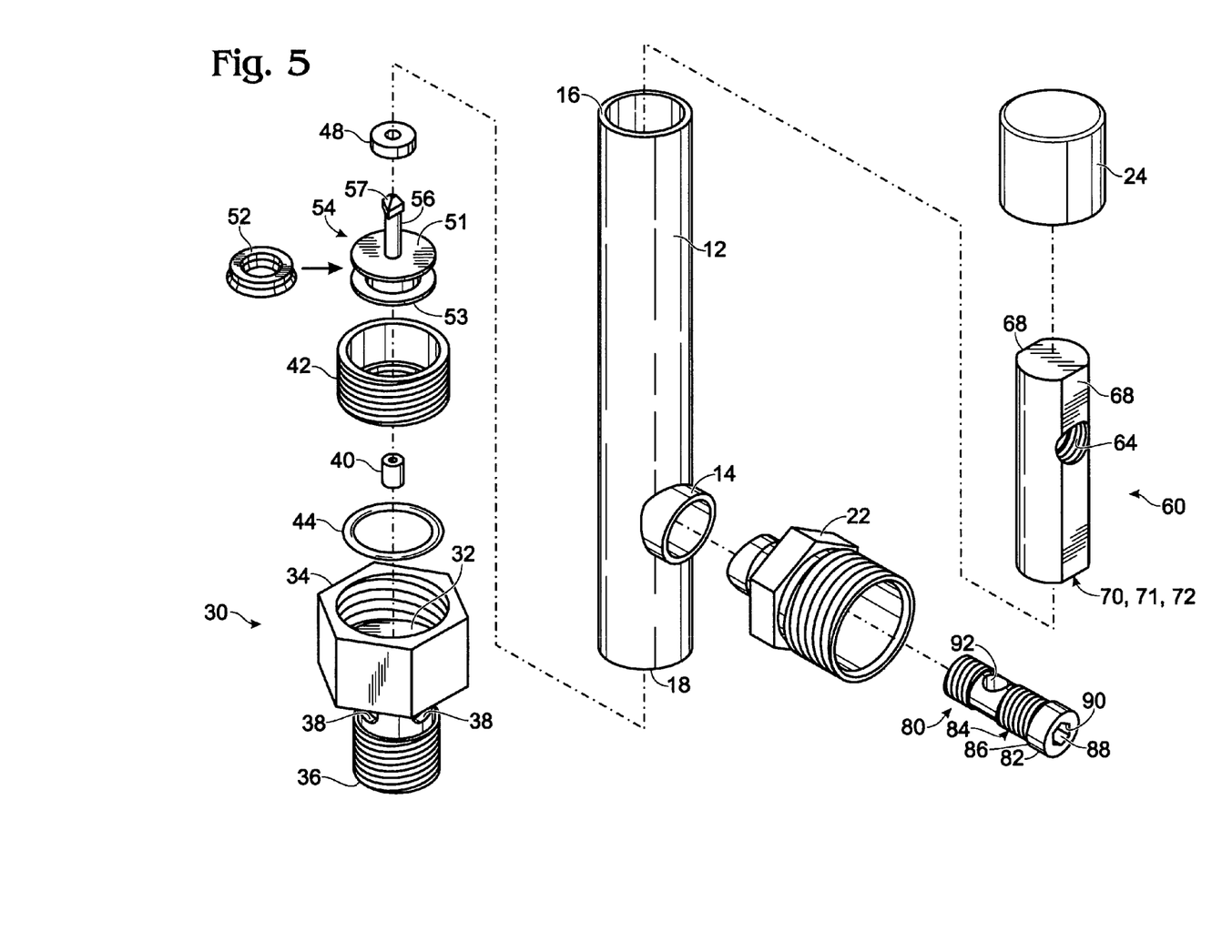
FIG. 5 shows an exploded isometric view of another embodiment of the present invention.
Figure 8:
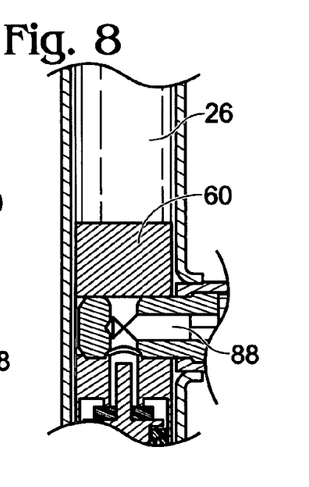
FIG. 8 shows another partial section of another embodiment with neither a check valve nor a piston.

Referring to FIGS. 5, 8 in conjunction with FIGS. 1, 2, 3, 6 and 9-11, a water hammer arrestor and drain trap primer valve 10 includes, in a first embodiment, a vertical tee tube 12 with a line inlet port 22 extending perpendicularly from tee tube 12, and a outlet port 30 extending vertically downward from tee tube 12. Tee tube 12 is a hollow tube, preferably copper, with open ends and a single side opening, the inlet 14, sized to accept inlet port 22. Inlet port 22 is soldered in place, but could be captured by welding, brazing, gluing, threading, or any other suitable means. A cap 24, preferably copper, provides gas-tight closure for tee tube closed end 16 by soldering. Alternatively welding, brazing, gluing, or other suitable processes could be used. Those skilled in the art know that there are a number of ways in which the tee tube closed end can be closed. Gas chamber 26 provides the surge volume to absorb a sudden inrush of water caused by a water hammer event-by absorbing the full volume of inrushing water the invention can effectively eliminate water hammer effect. The absorption capacity of gas chamber 26 may be easily increased by lengthening the vertical extension of tee tube 12, in order to accommodate plumbing systems of larger capacity or with more severe water hammer problems.

The tee tube discharging end 18 is connected to the threaded bushing 42 by soldering. Alternatively welding, brazing, gluing, or other suitable processes could be used. Threaded bushing 42 engages on its external threads with outlet port 30. Threaded bushing O-ring 44 seals the internal wet area from the threads of threaded bushing 42. Outlet port engaging end 34 is provided with internal threads which threadably engage threaded bushing 42. Outlet port 30 is provided with a small drain hole 32 countersunk to accommodate outlet seal 40, preferably Santoprene™. Vacuum holes 38 are provided in the sidewalls of outlet port 30 to prevent vacuum formation in the drain line. Outlet port distal end 36 is a ⅝" threaded compression fitting, a standard size which is compatible with most domestic water piping systems, engaging frictionally to nominal ½" copper tube conveying the discharge water to the storm water sewer. Other sizes could be used depending on need.

Figures 6, 7:
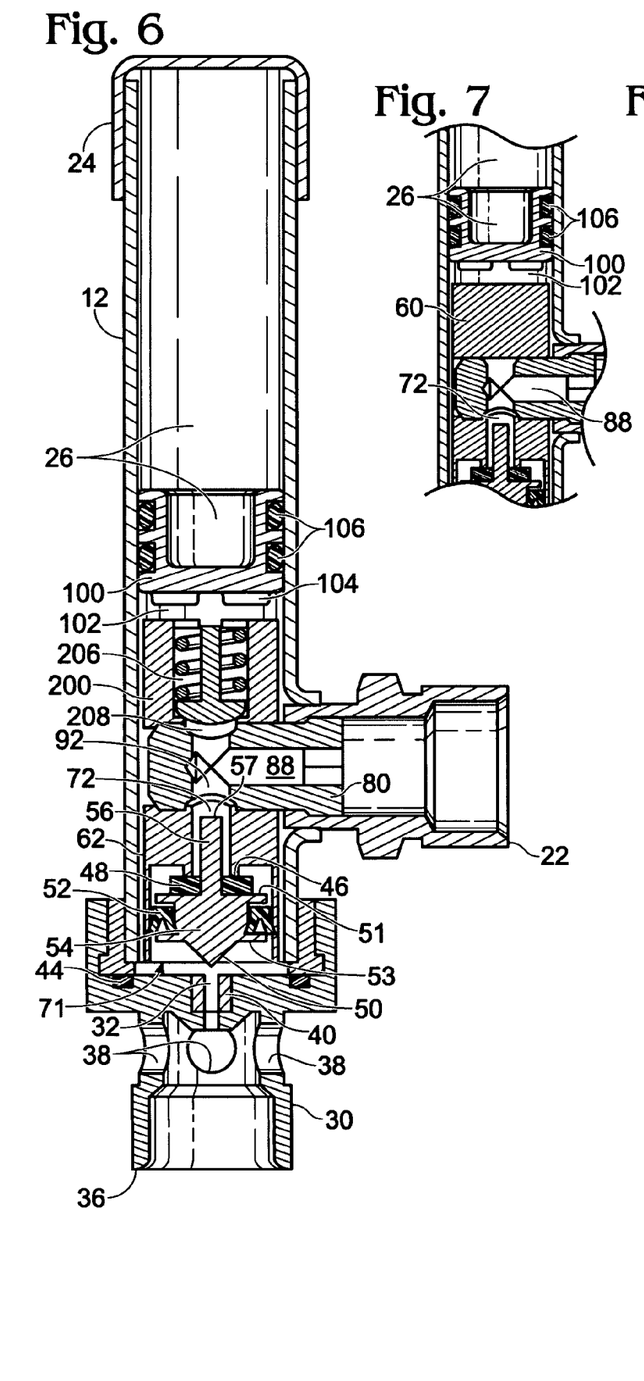
FIG. 6 shows a full sectional view of an embodiment of the present invention.
FIG. 7 shows a partial section of another embodiment without the check valve.

Insert plug 60 has a cross-section which is dissimilar to that of tube 12 so as to create flow channels between the inside wall of tube 12 and insert plug 60. Insert plug 60 is preferably round in cross section with diameter slightly less than the inner diameter of tee tube 12, and incorporates flats 68 which create channels 62 to permit water passage between insert plug 60 and tee tube 12. Alternatively insert plug 60 could incorporate a single flat side or more than two flat sides, an oval cross-section, longitudinal ribs, or other dissimilar cross-section, or simply an eccentric centerline to provide channels for water passage. As shown in FIGS. 5 and 7, insert plug 60 includes a closed upper part distal to the outlet port 30 and a generally hollow lower part with vertically extending sidewall 70 and an open end 71. Insert plug 60 further includes threaded passage 64 bored perpendicularly through a diameter in its solid upper part and an intersecting vertical passage 72 of smaller diameter bored along the central vertical axis from the bottom face 66 of insert plug 60. The intersecting vertical passage 72 extends to, and forms open end 71 (also shown in FIG. 6).

Threaded port bolt 80 engages insert plug threaded passage 64. Port bolt 80 is generally solid cylinder, with external thread diameter 84 slightly less than initial diameter 82, creating port bolt shoulder 86. Port bolt distributor 92 incorporates a reduced diameter to permit distribution of water to intersecting vertical passage 72 without need to align port bolt distributor 92. Threaded diameter port bolt 80 further includes inlet passage 88 extending along the central axis to intersect port bolt distributor 92. Inlet passage 88 incorporates internal flats 90 to permit tightening, preferably with an Allen wrench. When port bolt 80 is tightened insert plug 60 is pulled tightly toward the inner wall of tee tube 12 while port bolt shoulder 86 is pulled tightly against inlet 14 to provide a water tight seal, as well as providing positive capture to maintain insert plug 60 in place. Any vertical alignment eccentricity in insert plug 60 caused by this tightening is accommodated by check piston conical face 50 and outlet seal 40.

Figure 9:
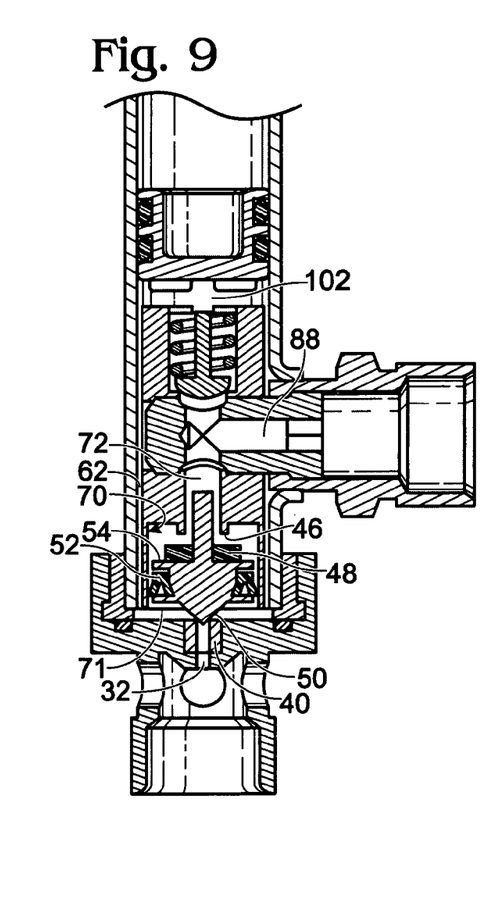
FIG. 9. shows an embodiment of the present invention in its normal stasis position.
Figures 10, 11:
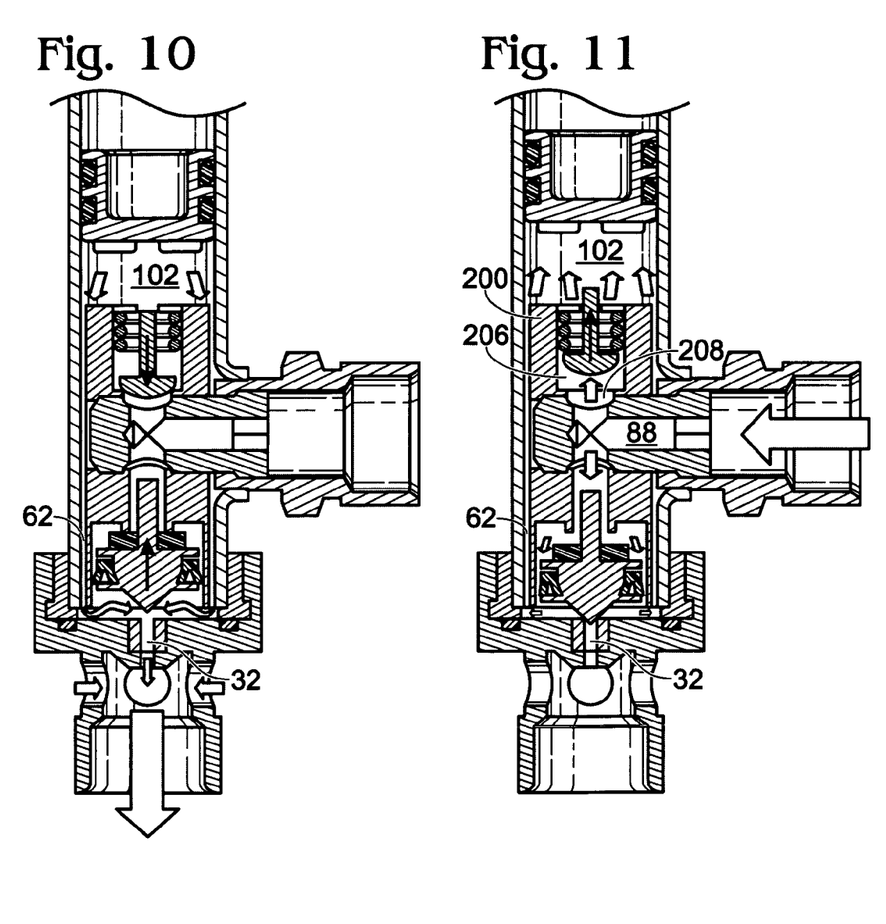
FIG. 10. shows an embodiment of the present invention discharging water.
FIG. 11. shows an embodiment of the present invention filling with water.

Check piston 54, with u-cup seal 52, fits within vertically extending sidewall 70. Check piston includes conical face 50, upper face 51, lower face 53, and stem 56. Check piston stem 56 fits slidingly within intersecting vertical passage 72 and terminates in a top surface 57. As shown in FIG. 9, inlet seal 48 is positioned atop check piston 54 to provide a watertight seal against lower sealing ring 46 on insert plug open end 71 when check piston 54 is raised to its top position. U-cup seal 52 is in contact with the inner wall of insert plug vertical sidewalls 70 facing downward, to permit passage of water downward during rising inlet line pressure conditions but preventing water passage upward past u-cup seal 52 during lowering inlet line pressure conditions. U-cup seal 52 may be a standard off-the-shelf u-cup seal or some other suitable one-directional seal. Conical face 50 engages outlet seal 40 when in the lower position to provide watertight seal preventing water from discharging through outlet port 30 during a rising inlet line pressure condition.

In operation a first embodiment acts as follows. On rising inlet line pressure water enters through inlet passage 88 in port bolt 80, is forced downward and distributed by distributor 92 to act on the top surface 57 of check piston 54, causing check piston 54 to seat against outlet seal 40. Water is thereby forced downwardly past u-cup seal 52, which relieves pressure in this direction, where it flows via clearances 62 into gas chamber 26 to compress the gas volume. As inlet line pressure decreases below the pressure of the gas volume, water in gas chamber 26 is forced back downward via the clearances 62. This higher pressure water acts against the bottom surface of check piston 54, and u-cup seal 52, thereby causing u-cup seal 52 to seal against the insert plug sidewall extension 70 preventing backflow, and displacing check piston 54 upwards. The upward displacement of check piston 54 unseats it from outlet seal 40 and seats inlet seal 48 against lower sealing ring 46, thereby causing the water to discharge through outlet port 30 to drain. When pressure in gas chamber 26 once again equals inlet line pressure check piston 54 reseats against outlet seal 40.

Through holes 38 are provided to prevent vacuum formation in the drain line which might prevent check piston 54 from opening correctly, as well as preventing back siphoning that could draw drain water into the plumbing piping. Through holes 38 further provide means to visually inspect the apparatus for leakage and operation.

The apparatus additionally acts as a water trap primer. Water is discharged to drain during water hammer events, as described above. Water is also discharged to drain during low-pressure events as follows:

When system pressure is at nominal equilibrium, water level within gas chamber 26 will remain essentially constant because gas pressure is equalized to system pressure. If system pressure drops due to a load being activated the gas pressure in gas chamber 26 is higher than system pressure, causing check piston 54 to unseat thereby allowing gas pressure to force water out through drain hole 32 and outlet port 30, until gas pressure again equals system pressure, at which point check piston 54 reseats. When system pressure returns to normal, water will expand into gas chamber 26, until system pressure stabilizes. No water will discharge at this point, because gas chamber pressure is equal to system pressure, and system pressure acts on the top of check piston 54 to seat it against atmospheric pressure in the drain line.

Referring to FIG. 7, in conjunction with FIGS. 1-4, 6, 9-11, a second embodiment is assembled similarly to the first described embodiment, but includes air chamber piston 100 to separate the water in upper chamber 102 from the gas in gas chamber 26. Air chamber piston 100 incorporates raised bosses 104 to provide clearance between the bottom face of air piston 100 and the top face of inlet plug 60. Two lubricated O-rings 106, preferably EPDM or nitrile, provide a seal between the water and gas volumes. Inclusion of air chamber piston 100 provides improved dampening effect so that small fluctuations in inlet line pressure will not cause check piston 54 to release partial discharges. Air chamber piston 100 further allows charging the water hammer arrestor with gas that will not react adversely with the fluid in the plumbing system. For example, nitrogen or argon could be used for deoxygenated water systems or systems with potentially explosive vapors. Additionally, wiper seals may be incorporated to protect o-rings 106 from debris.

Figure 4:
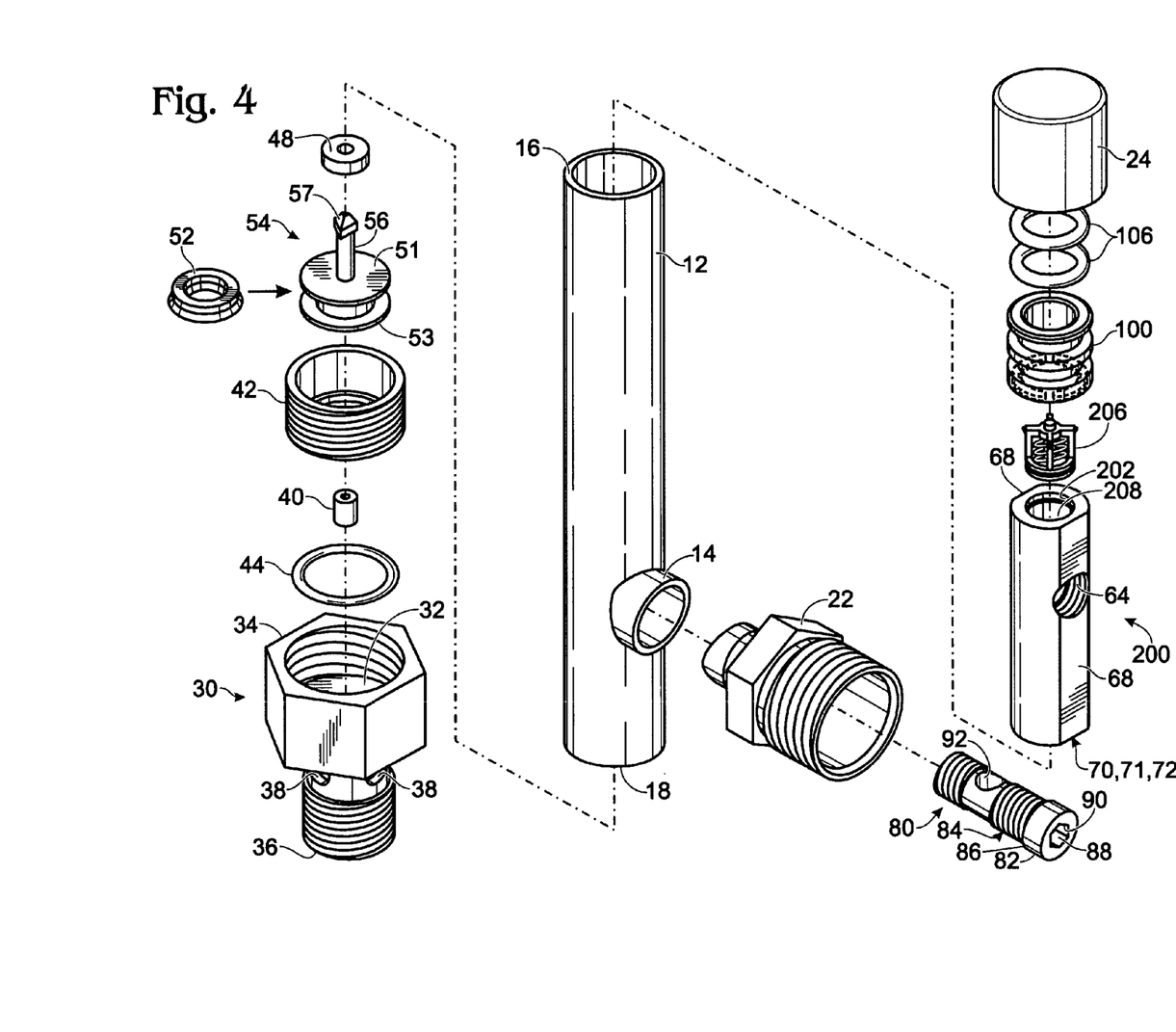
FIG. 4 shows an exploded isometric view of an embodiment of the present invention.

Referring to FIGS. 4 and 6, in conjunction with FIGS. 1-3, 9-11, a third embodiment is assembled similarly to the second described embodiment, above. In this third embodiment insert plug 200 incorporates vertical check valve 206, which is installed into upper passage 202 bored into the upper part of insert plug 200 so as to permit water passage upward into upper chamber 102 during rising inlet line pressure, but prevents downward flow from upper chamber 102 during lowering inlet line pressure. Vertical check valve 206 may be a standard type check valve, such as Neoperl™ OV 10-1™, manufactured by Neoperl, Inc., or any other suitable device to permit water passage upward into upper chamber 102 during rising inlet line pressure, but prevents downward flow from upper chamber 102 during lower inlet line pressure. During lowering inlet line pressure conditions vertical check valve 206 seats against upper inlet port 208 to prevent downward water flow. Insert plug 200 extends distally from outlet port 30 to provide sufficient clearance for installation of vertical check valve 206.

In operation this third embodiment operates as follows. On rising inlet line pressure water acts to unseat vertical check valve 206, allowing water to enter upper chamber 102. The high-pressure water in upper chamber 102 acts on the face of air chamber piston 100, moving air chamber piston 100 upward to compress the gas within gas chamber 26, until the pressure within the piston matches the inlet line water pressure. Simultaneously, high inlet water pressure acts directly on check piston 54 to seat it against outlet seal 40 thereby preventing water from discharging through outlet port 30 until after the pressure surge peaks. As inlet line pressure drops following a water hammer pressure spike, the gas pressure in gas chamber 26 is now greater than inlet line pressure, which pushes water in upper chamber 102 downward, thereby acting to seat vertical check valve 206 against upper inlet port 208. Seating vertical check valve 206 forces water to flow downward through channels 62 to act on the lower face 53 of check piston 54. At this point the water acting on the lower face 53 of check piston 54 is at higher pressure than the water acting on upper face of check piston 54 (which is at inlet line pressure), thereby forcing check piston 54 upward, unseating it from outlet seal 40, and permitting water from upper chamber 102 to discharge through outlet port 30. When air piston 100 returns to its normal stasis position, water pressure within the valve equalizes, and check piston 54 returns to seat against outlet seal 40.

Figure 12:
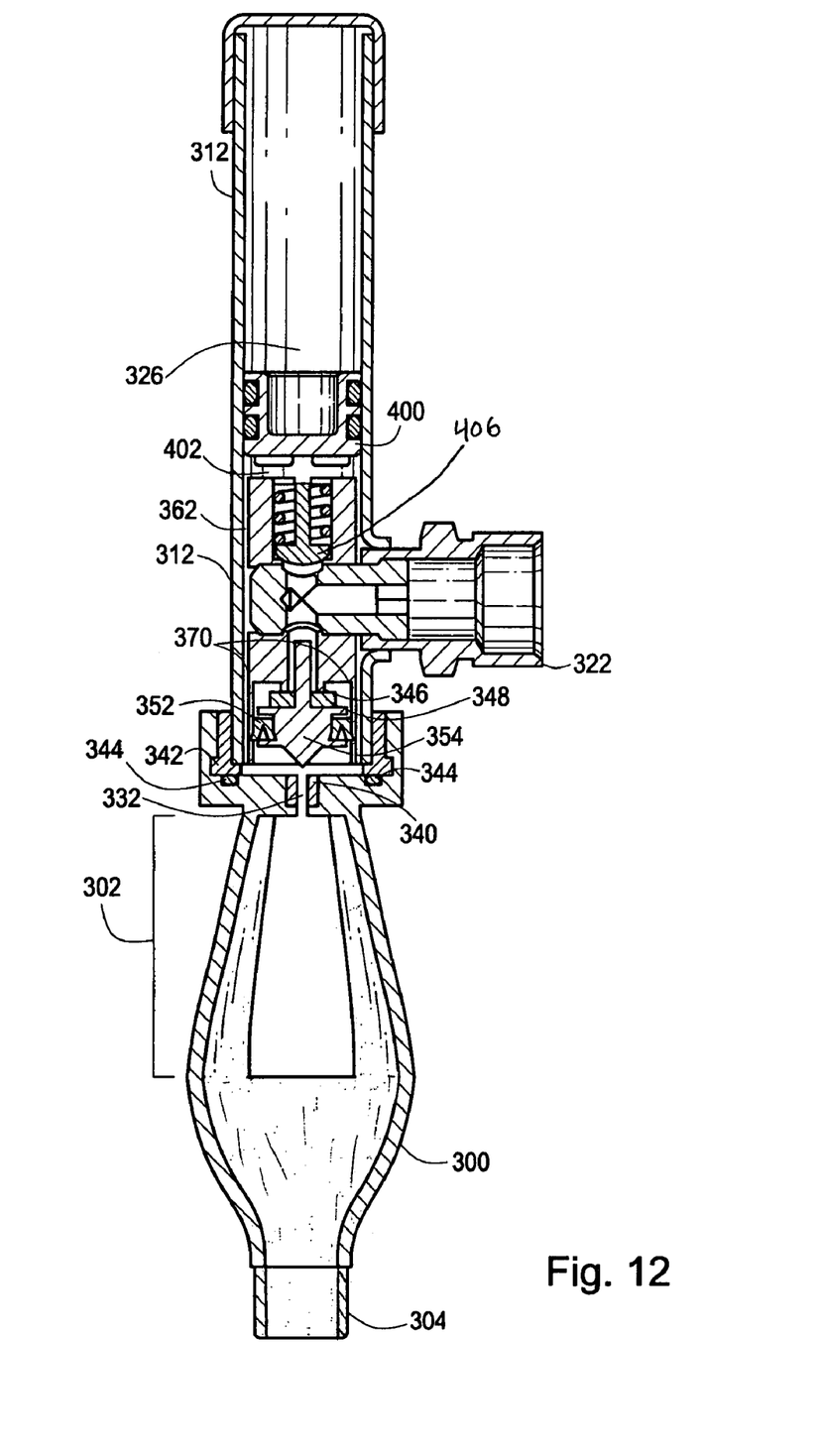
FIG. 12. shows an embodiment of the present invention with an integral air gap.

Referring to FIG. 12, a fourth embodiment is shown including an integral air gap. This embodiment is similar to the third embodiment described above, but includes integral air gap 300. An integral air gap 300 provides greater protection against cross-contamination than a typical vacuum breaker hole. With an air gap there is no direct connection between the supply main and the sewers so water cannot be sucked backwards. Air gap separation 302 is preferrably the greater of either twice the drain pipe diameter or one inch (25 mm). The total area of the air gap separation 302 is preferrably at least twice the area of the drain pipe cross section.

Air gap 300 is connected to tee-tube 312 using threaded bushing 342 and o-ring 344. Alternative means could be used as well, such as slip fittings, compression fittings, brazing, welding, soldering, gluing, and other known methods for connecting plumbing fittings. Air gap outlet 304 is connected to system drain piping using standard means. Check piston 354 seals against outlet seal 340 countersunk into drain hole 332 during an overpressure spike caused by a water hammer event. U-cup seal 352 allows the pressure wave to pass rapidly in the incoming direction, past the lower end of sidewall 370 and up through clearance 362 to upper chamber 402, thereby compressing gas in gas chamber 326. Air piston 400 may be included to maintain separation of the air and water. Simultaneously, check valve 406 lifts, allowing high pressure water a direct path into upper chamber 402 to rapidly absorb the inrush of a water hammer event. When the water hammer event has passed, gas pressure forces received water back down clearance 362, sealing check valve 406 from inlet 322, lifting check piston 354 sealing inlet seal 348 against lower sealing ring 346 and causing u-cup seal 352 to seat against sidewall 370, thereby preventing back flow. The received water discharges through drain hole 332, through integral air gap 300, without danger of siphoning from the plumbing drain system. The system is self-flushing as the water follows a through-flow path using unidirectional seals and the drain is below the inlet 322 and upper chamber 402.

The present invention seeks to solve both water hammer arrestor and drain trap priming problems with a single apparatus. When a water hammer event occurs the pressure wave causes water to surge into an air filled chamber, compressing the air. Because water is an incompressible fluid a small increase in volume causes a rapid decrease in pressure. Allowing the water to displace against air pressure increases the system volume, thereby rapidly decreasing system pressure, and raising the air pressure. A piston acts as a check valve to prevent water from porting to drain during the rising portion of the pressure wave, but permits high-pressure water to surge into the air chamber freely. When the inlet line pressure begins to decrease, following the pressure peak, the compressed air is at higher pressure than the pressure at the inlet line. This pressure differential causes the check piston 54 to displace upward, opening the drain port but sealing the inlet port, such that water displaced into the air chamber is forced out by air pressure into the drain port. When air chamber pressure lowers to system pressure, the check piston returns to its bottom position sealing the discharge port, held in place by system pressure against atmospheric pressure in the drain line. Holes can be provided in the discharge port to vent the drain to atmosphere, preventing vacuum buildup and providing a means for inspecting the valve for leakage and operation.

By discharging the displaced water to drain, rather than returning it to the system piping, little to no return pressure wave is generated and the water hammer effect ceases rapidly. Moreover, pressure oscillations caused by opening and closing of valves, or by intentionally lowering then raising system pressure, will cause water to be discharged through the valve thereby maintaining sufficient water in the sewage drain trap to prevent backflow of sewer gases up through system drains.

The mechanical construction of this device may be varied widely without departing from the principle of control herein disclosed. Alternative materials may be used, depending on manufacturability, price, and fluid compatibility considerations. For example, parts may be machined from copper, brass, stainless steel, titanium, or other suitable metals. Alternatively, parts may be made from machined or injection molded polyvinylchloride (PVC), polyvinyldifluoride (PVDF), perfluoroalkoxy (PFA), or other suitable plastics. Seals and o-rings constructed from self-lubricating plastics such as Teflon™ and Delrin™ may be used to lengthen lifespan of parts.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. A water hammer arrestor and drain trap primer valve, comprising:
   a hollow pipe including an inner wall, a closed end, a discharging end, and inlet;
   an outlet port connected to said discharging end and attachable to plumbing tubing;
   an inlet port connected to said inlet and attachable to plumbing tubing;
   an insert plug within said pipe positioned at said discharging end and at said inlet, said insert plug substantially tubular with cross-section dissimilar to that of said hollow pipe so as to allow fluid flow between said insert plug and said hollow pipe inner wall, and said insert plug including a longitudinal cylindrical bore and a latitudinal threaded through bore;
   a port bolt within a portion of said insert plug and a portion of said inlet port, said port bolt substantially tubular and having a longitudinal cylindrical bore and a latitudinal through bore distributor aligned with the insert plug longitudinal cylindrical bore; and
   a check piston within said pipe and slidingly engageable with said insert plug and said outlet port wherein said check piston engages slidably responsive to water pressure changes at said inlet port.

2. The apparatus of claim 1, further comprising an air piston within said pipe positioned between said insert plug and said closed end.

3. The apparatus of claim 1, further comprising a check valve positioned within said insert plug distally located in relation to the pipe discharging end.

4. A water hammer arrestor and trap seal primer as in claim 1, 2 or 3, wherein said outlet port further comprises an integral air gap separator.

5. A water hammer arrestor and trap seal primer as in claim 4, wherein said integral air gap separator separation distance is the greater of one inch (25 mm) or twice the diameter of said plumbing tubing to which said outlet port is connectable to.

6. A water hammer arrestor and drain trap primer as in claim 1, 2, or 3, wherein said insert plug cross-section is circular with at least two opposing flats.

7. A water hammer arrestor and drain trap primer as in claim 1, 2, or 3, wherein said insert plug cross-section is oval.

8. A water hammer arrestor and drain trap primer as in claim 4, wherein said insert plug cross-section is circular with at least two opposing flats.

9. A water hammer arrestor and drain trap primer as in claim 4, wherein said insert plug cross-section is oval.

10. A water hammer arrestor and trap seal primer, comprising:
    a side inlet connectable to system plumbing, a bottom outlet connectable to a plumbing drain trap, said bottom outlet including an integral air gap, and an expansion chamber located above said side inlet and said bottom outlet;
    a distributor interposed between, and in fluid communication with, each of said side inlet, said bottom outlet and said expansion chamber, said distributor including an internal channel and one or more external channels;
    a check piston within said distributor internal channel disposed between said side inlet and said bottom outlet, said check piston including a one-way seal allowing flow from said internal channel to said external channels;
    wherein, when system plumbing pressure exceeds gas pressure in said expansion chamber, said check piston seats against said bottom outlet, and said one-way seal permits water flow from said internal channel to said expansion chamber via said external channels, thereby reducing pressure in said system plumbing by trapping a volume of water;
    and further wherein, when system plumbing pressure decreases to less than expansion chamber gas pressure, said check piston seats against said internal channel, thereby porting said received water volume exclusively to said bottom outlet via said external channels.

11. A water hammer arrestor and trap seal primer as in claim 10, further comprising:
    check valve means within said distributor, said check valve in fluid communication with said side inlet and said expansion chamber, said check valve permitting rapid fluid flow from said side inlet to said expansion chamber and blocking fluid flow from said expansion chamber to said inlet.

12. A water hammer arrestor and trap seal primer as in claim 10 or 11, further comprising:
    a piston disposed within said expansion chamber, said piston separating the gas portion from the liquid surface within said expansion chamber.

13. A water hammer arrestor and trap seal primer, comprising:
    an inlet connectable to a plumbing system; an expansion chamber above said inlet; an outlet below said inlet, said outlet connectable to a plumbing system drain trap, and said outlet including an integral air gap;
    first check valve means between said inlet and expansion chamber permitting rapid inflow of water due to water pressure event, but preventing flow from expansion chamber to inlet;
    second check valve means between said expansion chamber and said outlet;
    such that when fluid pressure at said inlet rises above gas pressure in said expansion chamber as in a water hammer event, said first check valve means allows water inflow into said expansion chamber, thereby reducing plumbing system pressure caused by a water hammer event, and further wherein, said second check valve means prevents flow from said expansion chamber to said outlet;
    and, such that when fluid pressure at said inlet drops below gas pressure, said first check valve means prevents return flow from said expansion chamber into said inlet and said second check valve means permits water flow from said expansion chamber to said outlet, thereby directing water received during a water hammer event to drain and preventing a reflected water hammer event.

14. A water hammer arrestor and drain trap primer valve, comprising:
    A hollow pipe including an inner wall, a closed end, a discharging end, and inlet;
    An outlet port connected to said discharging end and attachable to plumbing tubing;
    An inlet port connected to said inlet and attachable to plumbing tubing;
    An insert plug within said pipe positioned at said discharging end and at said inlet, said insert plug substantially tubular and having a circular cross-section with an eccentric centerline in relation to said hollow pipe so as to allow fluid flow between said insert plug and said hollow pipe inner wall, and said insert plug further including a longitudinal cylindrical bore and a latitudinal threaded through bore;

A port bolt within a portion of said insert plug and a portion of said inlet port, said port bolt substantially tubular and having a longitudinal cylindrical bore and a latitudinal through bore distributor aligned with the insert plug longitudinal cylindrical bore; and A check piston within said pipe and slidingly engageable with said insert plug and said outlet port wherein said check piston engages slidably responsive to water pressure changes at said inlet port.

15. The apparatus of claim 14, further comprising an air piston within said pipe positioned between said insert plug and said closed end.

16. The apparatus of claim 14, further comprising a check valve positioned within said insert plug distally located in relation to the pipe discharging end.

17. The apparatus of claim 14, wherein said outlet port further comprises an integral air gap separator disposed between said discharge port and said outlet port, said air gap separator including an open separation portion.

18. The apparatus of claim 15, wherein said outlet port further comprises an integral air gap separator disposed between said discharge port and said outlet port, said air gap separator including an open separation portion.

19. The apparatus of claim 16, wherein said outlet port further comprises an integral air gap separator disposed between said discharge port and said outlet port, said air gap separator including an open separation portion.

20. The apparatus of claim 17, 18 or 19, wherein said integral air gap separator open separation portion minimum length is the greater of one inch (25 mm) or twice the diameter of said plumbing tubing to which said outlet port is connectable to.

* * * * *